(12) United States Patent
Yu et al.

(10) Patent No.: US 10,663,750 B2
(45) Date of Patent: May 26, 2020

(54) SUPER-RESOLUTION IMAGING OF EXTENDED OBJECTS

(71) Applicant: The Regents of the University of Colorado, a body corporate, Denver, CO (US)

(72) Inventors: Juin-Yann Yu, Boulder, CO (US); Carol J. Cogswell, Boulder, CO (US); Simeng Chen, Boulder, CO (US); Robert H. Cormack, Erie, CO (US); Jian Xing, Boulder, CO (US)

(73) Assignee: The Regents of the University of Colorado, a body, Denver, CO (US)

( * ) Notice: Subject to any disclaimer, the term of this patent is extended or adjusted under 35 U.S.C. 154(b) by 61 days.

(21) Appl. No.: 16/085,524

(22) PCT Filed: Mar. 15, 2017

(86) PCT No.: PCT/US2017/022600
§ 371 (c)(1),
(2) Date: Sep. 14, 2018

(87) PCT Pub. No.: WO2017/161055
PCT Pub. Date: Sep. 21, 2017

(65) Prior Publication Data
US 2019/0121155 A1   Apr. 25, 2019

Related U.S. Application Data

(60) Provisional application No. 62/308,799, filed on Mar. 15, 2015.

(51) Int. Cl.
G02B 27/58   (2006.01)
G02B 21/00   (2006.01)
(Continued)

(52) U.S. Cl.
CPC ......... *G02B 27/58* (2013.01); *G01N 21/6458* (2013.01); *G02B 21/002* (2013.01);
(Continued)

(58) Field of Classification Search
CPC .... G02B 27/58; G02B 21/002; G02B 21/367; G02B 27/0075; G01N 21/6458; G06T 3/4053
See application file for complete search history.

(56) References Cited

U.S. PATENT DOCUMENTS

2016/0048963 A1*   2/2016   Piestun ................ G06K 9/6807
                                                                 382/154
2016/0246042 A1*   8/2016   Enderlein .......... G02B 21/0048

* cited by examiner

*Primary Examiner* — Thai Q Tran
*Assistant Examiner* — Jose M Mesa
(74) *Attorney, Agent, or Firm* — Macheledt Bales LLP; Jennifer L. Bales

(57) ABSTRACT

Apparatus and methods for super-resolution imaging of extended objects utilize a scanned illumination source with a small spot size. Sub-images composed of highly-overlapping point spread functions are captured and each sub-image is iteratively compared to a series of brightness combinations of template point spread functions in a dictionary. The dictionary is composed of highly-overlapping point spread functions. Each sub-image is associated with a best-match template combination solution, and the best-match reconstructions created by best-match solutions are combined into a super-resolution image of the object.

15 Claims, 6 Drawing Sheets

(51) Int. Cl.
*G02B 27/00* (2006.01)
*G01N 21/64* (2006.01)
*G02B 21/36* (2006.01)
*G06T 3/40* (2006.01)

(52) U.S. Cl.
CPC ....... *G02B 21/367* (2013.01); *G02B 27/0075* (2013.01); *G06T 3/4053* (2013.01)

SUPER-RESOLUTION IMAGING OF EXTENDED OBJECTS

This invention was made with government support under grant number DBI1353444 awarded by the National Science Foundation. The government has certain rights in the invention.

BACKGROUND OF THE INVENTION

Field of the Invention

The present invention relates to apparatus and methods for super-resolution imaging of 2D and 3D extended objects through optimization decoding of spatially overlapping point spread functions (PSFs).

Discussion of Related Art

Advances in optical microscopy continue to take center stage due to their potential for non-invasive imaging in such diverse applications as live-cell dynamics, particle tracking, and nano-scale materials fabrication. In particular, biological research communities have long been eager for high speed three-dimensional "super-resolution" optical imaging (i.e. image resolutions beyond the diffraction limit)—techniques that enable the observation of mechanical and biochemical dynamics in living cells down to nanometer scales. However, if this goal to observe ever-smaller objects is to be achieved, two fundamental limits in current optical imaging theory must be addressed: (1) diffraction (which maintains that object features smaller than ~250 nm cannot be resolved) and (2) out-of-focus blur that arises from objects above and below the plane of best focus. Recently, microscopes developed to overcome the first of these limits (i.e. diffraction) were so significant to biological fluorescence imaging studies that they led to the awarding of the 2014 Nobel Prize in Chemistry. However, these new microscope approaches, based on either stimulated emission (STED) or particle localization (PALM or STORM), have major problems for 3D imaging at speed.

The second fundamental limit of optical imaging (the out-of-focus blur) has led to the development of microscopes such as laser-scanning confocal systems over the past 30 years. However, these instruments still do not meet the goal of imaging an extended 3D sample volume at high speed (i.e. in real time or faster). This is because they require through-depth image acquisitions at each experimental time point in order to remove out-of-focus features from each acquired image plane. In addition, confocal-like systems provide minimal resolution improvement beyond the diffraction limit.

Nearly all existing high- and super-resolution imaging techniques rely on the objective lens forming a tightly focused point spread function over a flat plane, which is the most photon-efficient approach for pursuing precise two-dimensional imaging. However, such an approach has two drawbacks: (1) it provides rather limited (i.e. no super-resolution) information about the third dimension, as these tightly-focused PSFs are, in most cases, axially invariant near their best-focus plane and (2) image features rapidly go out of focus when observing objects that are thicker than the plane of best focus.

One use of super resolution microscopy is the examination of continuous biological structures. Existing devices generally require photo-switchable fluorophores, stimulated emission depletion, or specially designed illumination patterns.

A need remains in the art for apparatus and methods for improved super-resolution imaging of 2D and 3D extended objects.

SUMMARY OF THE INVENTION

An object of the present invention is to provide apparatus and methods for improved super-resolution imaging of 2D and 3D extended objects. An embodiment first scans an object using an illumination spot which subdivides the field of view into a series of small sub-images and then applies a numerical optimization procedure to differentiate the overlapping PSFs to super-resolution (sub-diffraction-limit) accuracy in the resulting small sub-images.

The illumination spot size is approximately the size of a diffraction-limited focused beam (or slightly larger), and ensures that each recorded sub-image is composed of only the PSFs produced by sample features that fall within the illumination beam.

This invention demonstrates two-dimensional and three-dimensional super-resolution imaging for extended object features when observed using microscopes or other optical instruments such as endoscopes.

A method of super-resolution imaging an extended object includes the steps of providing an illumination source configured to illuminate the object with an illumination spot having an illumination spot area at the object, scanning the illumination spot across the object, capturing a series of sub-images of the object wherein the sub-image detection region area substantially exceeds the illumination spot area, providing a dictionary of templates comprising PSFs, comparing each sub-image to combinations of highly-overlapping PSF templates from the dictionary, while varying intensities of individual PSF templates, to find a best-match solution for that sub-image; and creating a best-match reconstruction of each sub-image from the best-match solution for that sub-image. Generally the best-match reconstructions of sub-images are then combined to form a super-resolution image of the object. In some cases overlapping sub-images are captured, in order to improve final image quality.

One embodiment of the invention utilizes a non-negative least-squares optimization algorithm to find best-match solutions. In addition, a phase plate or equivalent may be placed in the illumination path in order to produce depth-encoded sub-images of the object having point spread functions (PSFs) which vary according to depth range. Once depth range is decoded, super-resolution in the third, axial dimension is possible. Axial super-resolution can be as good as X-Y super-resolution. Fluorescent objects may be super-resolved by this method.

BRIEF DESCRIPTION OF THE DRAWINGS

FIG. 2A shows the illumination spot and associated sub-image capture. FIG. 2B is a schematic block diagram showing how sub-images are acquired and processed.

FIG. 5A shows an image captured by a traditional fluorescence microscope at NA0.5. FIG. 5B shows a super-resolved image of the same object at the same NA. FIG. 5C shows a traditional image at NA1.4.

FIG. 6A shows a three-dimensional rendering of a super-resolved fluorescent biological object produced according to the present invention. FIG. 6B shows a super-resolved side-view of the same object. FIG. 6C is a side-view image of the same object assembled from a confocal laser scanning microscope image stack.

DETAILED DESCRIPTION OF THE INVENTION

Figure 1:
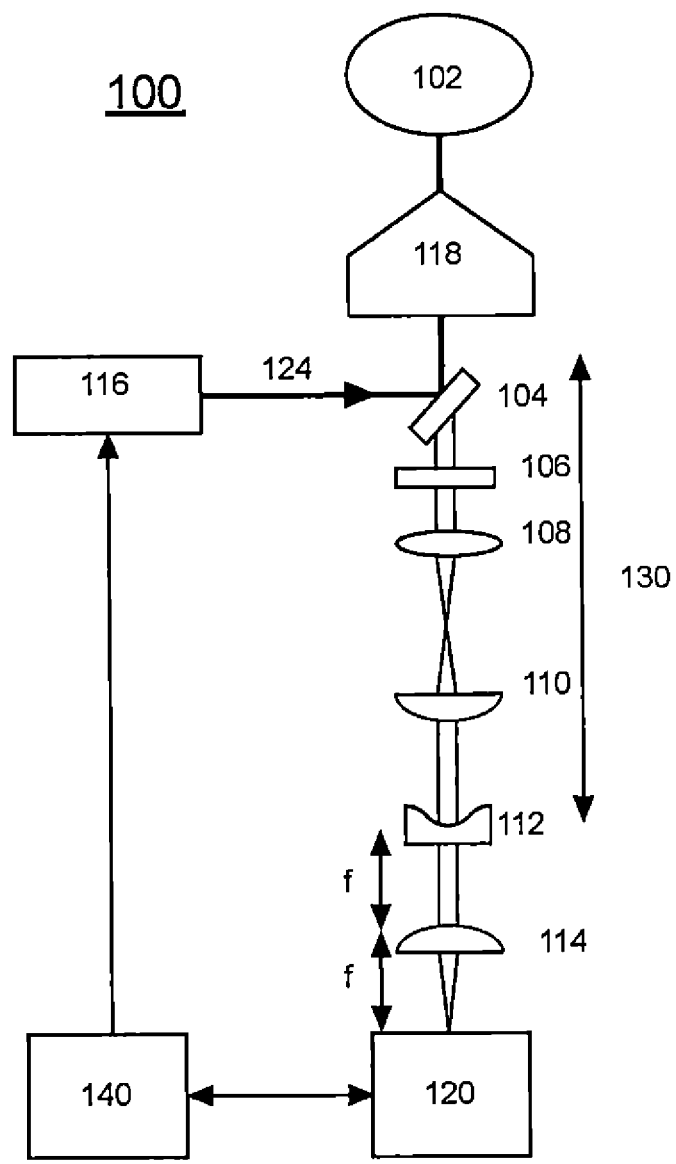
FIG. 1 is a block diagram illustrating an embodiment of the present invention.

FIG. 1 is a block diagram illustrating an embodiment of the present invention. This embodiment comprises a microscope 100 and optionally includes a phase plate such as a circular caustic. The phase plate is useful for 3D imaging, as a convenient way to form a set of axially asymmetric PSFs. Note however that asymmetric sets of PSFs can be produced in other ways. The optics of the imaging system itself will often result in such PSFs. For example, such PSFs could be produced by lenses such as axicons or cylindrical lenses. Also note that a phase plate or equivalent is not required for two dimensional super-resolution imaging.

Briefly, a narrow beam 124 is focused onto object 102 and scanned over object 102 by an illumination source with scanning apparatus 116. Beam splitter 104 provides scanning illumination 124 to object 102 and then allows the image light to travel the imaging path to camera 120. Scanning apparatus 116 might comprise, for example, XY scanning mirrors and other optics controlled by processor 140. In this embodiment, a laser may be used, but incoherent light works as well.

Sub-images 204 (see FIG. 2) are relayed through lens 108, lens 110, phase plate 112 (if used), and lens 114 to image on camera 120. Camera 120 is placed at the back focal plane of lens 114, and phase plate 112 is placed at the front focal plane of lens 114. Phase plate 112 is conjugate 130 with the objective 118 back focal plane. EMF 106 is an optional fluorescent filter that is useful when imaging fluorescent objects.

Camera 120 provides the sub-images to processor 140. Processor 140 iteratively compares each sub-image to combinations of PSF templates within a modeled dictionary of templates (see FIGS. 2-4) and each sub-image is matched and associated with a best-match solution. Processor 140 then creates best-match reconstructions from the best-match solutions and combines the reconstructions associated with the sub-images to form a super-resolution image of the object.

The embodiment of FIG. 1 optionally utilizes a phase plate 112 to, for example, to generate ring-shaped PSFs as described in U.S. Pat. No. 9,325,971 ("Engineered Point Spread Function for Simultaneous Extended Depth of Field and 3D Ranging," incorporated herein by reference). In this configuration, it achieves super-resolution imaging in all three-dimensions rather than just two-dimensional super-resolution imaging as in 2D embodiments. Briefly, the diameter of each ring is related to its depth in the object.

This process is not limited to microscopes. Endoscopes, telescopes, etc. can use the same process. Further, various kinds of illumination or excitation may be used depending upon the object to be imaged.

Embodiments of the present invention use alternative designs of the conventional optical imaging system so that they preferably produce image PSFs according to the following criteria:

1. For imaging 2D extended objects, PSFs preferably comprise a set of best-focus Airy disc PSFs that can be detected digitally using numerical optimization with no ambiguity, even though they are highly-overlapping.
2. For imaging 3D extended objects, axial shift of the PSFs ideally form a range of unique shapes (such as rings) that can be precisely correlated to sample depth and can be detected digitally using numerical optimization with no ambiguity. This has advantages over traditional Airy disc PSFs where identical shapes appear when moving in either direction from the best-focus plane.
3. For imaging 3D extended objects, photons radiating from the original object are generally redirected into these PSFs in such a way as to maximize the uniformity of their intensities over extended depths, rather than concentrating all photons into a "best focus" spot as in traditional Airy disc PSFs. A goal is increased dynamic range.
4. For imaging 3D extended objects, PSFs are preferably designed to contain maximum information content and high signal-to-noise ratio (SNR) over depths as much as 20 times thicker than the imaging lens depth of field (DOF).
5. The size of illumination (the diameter of the scanning illumination spot) for one recorded image is limited to a relatively small region that is only a few times greater (e.g. 1.5-2 times greater) than a diffraction-limited illumination spot. This ensures that the PSF overlapping can be well conditioned for digital processing. This small illumination region (or an array of small regions) is then scanned in a two-dimensional pattern to build up an image of the entire 2D or 3D object.

Figure 2A:
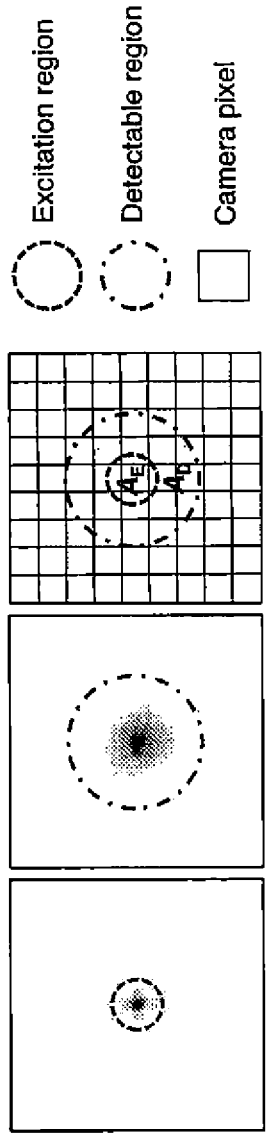
FIGS. 2A and 2B illustrate an overview of a method of super-resolution imaging of an extended object according to the present invention.
Figure 2B:
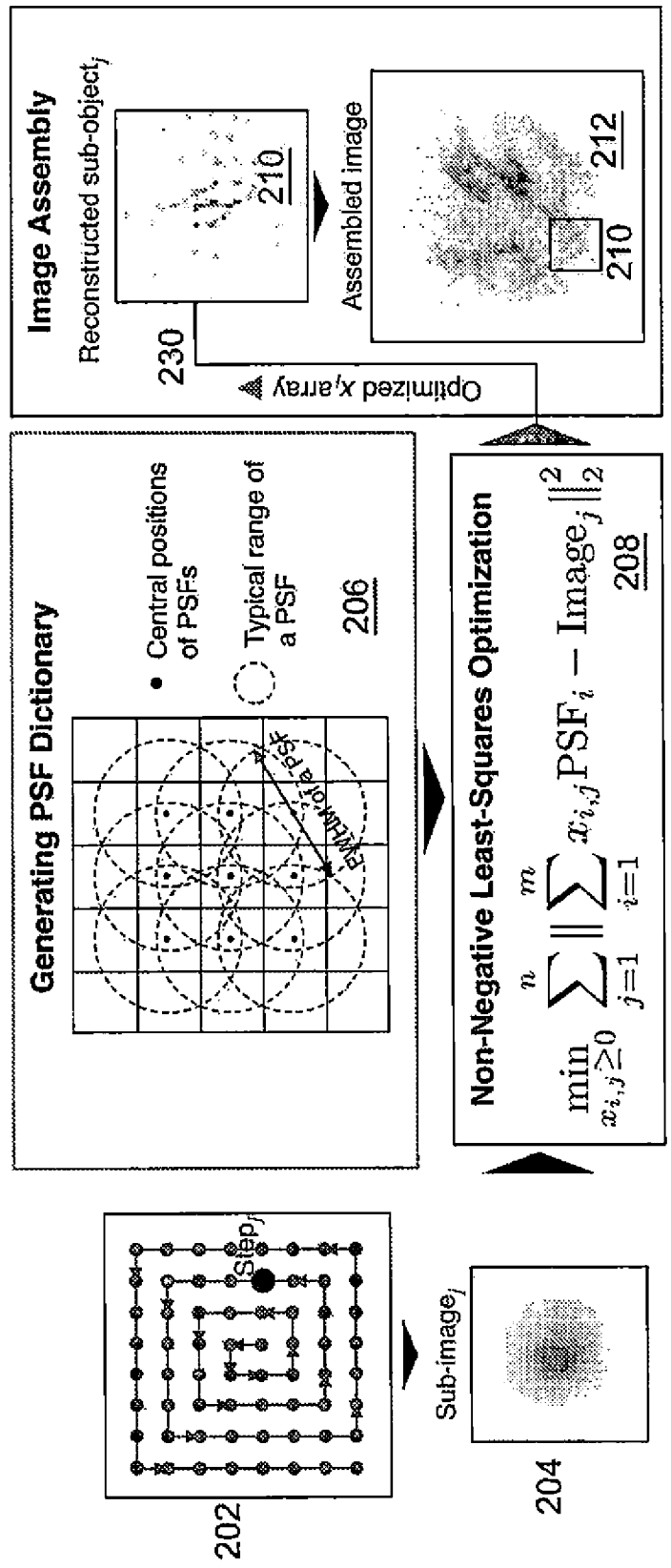

FIGS. 2A and 2B illustrate an overview of a method of super-resolution imaging of an extended object according to the present invention. (See FIGS. 3A-3C for more detail.) FIG. 2A illustrates the illumination spot size 220 at the object (left image) as compared to the sub-image detection region 204 (center image). The right-hand image is a schematic diagram illustrating the comparison between the illumination spot area 226 ($A_E$) and detection region area 228 ($A_D$). Note that for convenience, "detection region area" is defined as "the area the detection region would cover projected back to the object (i.e. the detection region at the detector divided by the magnification power of the imaging system 100).

The sub-image detection region area is considerably larger than the illumination spot area, for example about an order of magnitude bigger. Ratios $(A_D)/(A_E)$ of 2:1 work to some extent. A ratio of 9:1 has been found to work well.

Limiting the size of the illuminated sample region (the illumination spot size 220) is essential to achieve super-resolution. As an example, modeling a microscope formulates a fluorescence image as a linear superposition of the PSFs of individual point-like fluorescent photo-emitters. This leads to a series of linear equations:

$$I(s_k) = \sum_{i=1}^{n} x_i \cdot PSF_i(s_k), k = 1, 2, \ldots, p, \quad (1)$$

where k denotes the indices of individual pixels, $I(s_k)$ denotes the intensity detected by the camera pixel at position $s_k$, $x_i$ denotes the brightness of the i-th photo-emitter (i.e. the unknowns we are trying to determine), n is the total number of individual photo-emitters, $PSF_i$ denotes the intensity point spread function formed by photo-emitter$_i$, and p is the total number of pixels.

Since Eq. (1) is a linear system, if the detection is noiseless, and if all of the n PSFs are known a priori and are linearly independent, we only need the intensities detected by n individual pixels to solve x exactly. The brightness of each of the photo-emitters can be recovered, even though their combined image PSFs are highly overlapped (spaced much closer together than the Rayleigh two-point resolution criterion for optical imaging). Since physical systems do have detector readout noise and photon shot noise, it is favorable to have the number of detections (i.e., number of pixels in the detection region, n) larger than the number of unknowns (i.e., the number of photo-emitters, p) in order to solve for the brightness coefficients $x_i$ accurately. FIG. 2A shows that the total number of photo-emitters (unknowns) is approximately proportional to the illumination area $A_E$, while the total number of pixels in the recorded sub-image PSFs (i.e. detections) is proportional to the image detection area $A_D$. An estimate of numerical problem determination is given by dividing the detection area by the illumination area:

$$\text{Determination ratio} \equiv \frac{\# \text{ of detections}}{\# \text{ of unknowns}} \propto \frac{A_D}{A_E}. \quad (2)$$

The smaller the illumination area, the higher the determination ratio (Eq. 2), and therefore the more 'determined' the equation system. This has been confirmed by experiments showing that the higher the determination ratio the greater the amount of super-resolution achievable while keeping image noise artifacts to a minimum.

FIG. 2B is a schematic block diagram illustrating the process of how sub-images 204 are acquired through scanning 202, iteratively associated to PSF templates from a dictionary of templates 206 using a numerical optimization procedure 208, and the set of best match solutions 230 are reconstructed 210 and combined to generate a super-resolution image 212. Specifically, an acquired sub-image 204 is compared to combinations of highly-overlapping PSF templates from dictionary 206 until a best-match solution 230 is found. Generally the PSF templates are fixed in position once the dictionary is provided. The PSF template intensities are varied (including being set to zero) while process 208 is performed for each sub-image 204. Experiments have shown that overlapping sub-images 204 results in better final images 212.

Note that the dictionary of templates is preferably calibrated to the set of PSFs produced by the imaging system so that the resulting reconstructed image is accurate for that imaging system. For example, in a two-dimensional imaging configuration of the embodiment of FIG. 1, the sub-images 204 (see FIG. 2) might be composed of overlapping Airy discs. In a fluorescence system, the photo-emitters have real, non-negative brightness.

202 illustrates an example of a scanning pattern performed at the object 102, in this case a spiral pattern. Generally, the scanning is done in steps, with a sub-image captured at each step. 204 is an example of a sub-image acquired during the scanning process. 206 shows a dictionary of templates which may be iteratively compared to each sub-image. 208 shows the image comparison process, in this case a non-negative least-squares optimization process. This process finds a best-match solution 230 for each sub-image and then creates a best-match reconstruction 210 of sub-image 204 from the best-match solution 230. 212 shows the reconstructed image formed from combining best-match sub-image reconstructions 210.

Figure 3A:
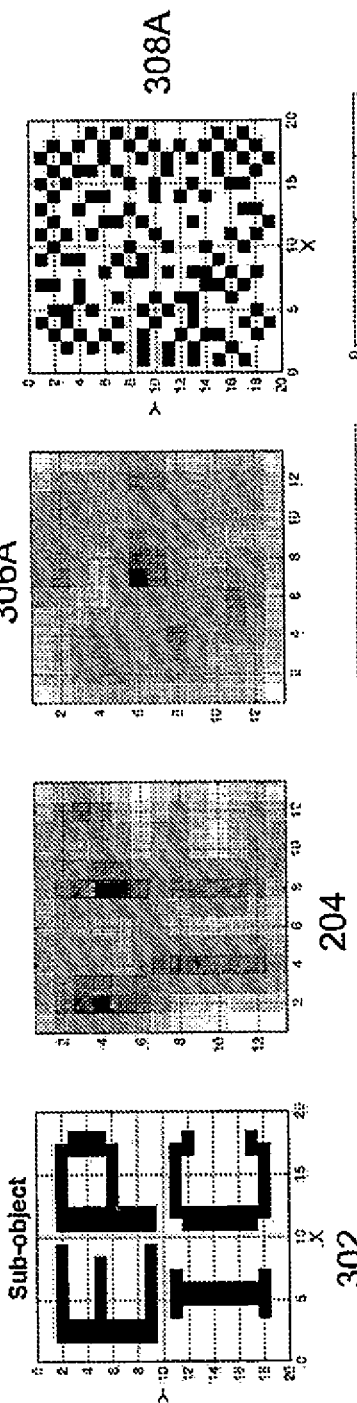
FIGS. 3A-3C are diagrams showing the process of iteratively matching an acquired sub-image to a combination of PSF templates from a dictionary.
Figure 3B:
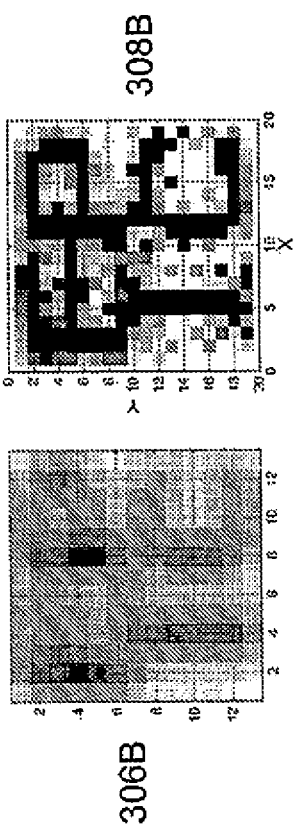
Figure 3C:
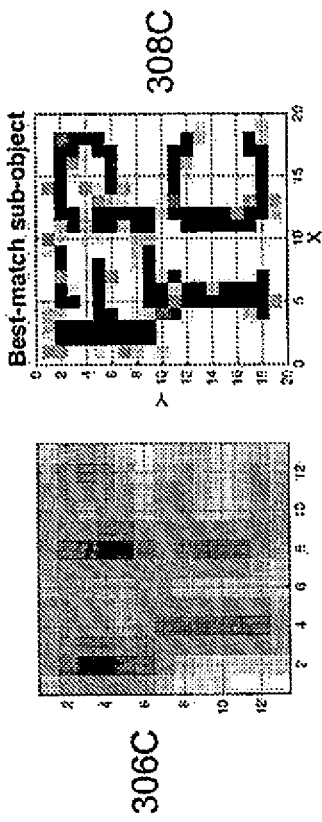

FIGS. 3A-3C are diagrams showing in more detail the process of iteratively comparing an acquired sub-image 204 to combinations of highly-overlapping PSF templates from a dictionary 206 to find a best-match solution.

FIG. 3A shows sub-object 302, which represents the ground-truth of this portion of the object. 204 is the acquired sub-image from sub-object 302. 306A is an intermediate solution after one iteration of process 208 (which is comparing solutions 306A-C to acquired sub-image 204). 308A represents what the reconstructed object sub-image 204 would look like after this one iteration. In general the process would not reconstruct intermediate sub-images—this is shown for clarity.

FIG. 3B shows the result after 51 iterations. 306B is an intermediate solution and 308B is how the intermediate reconstructed sub-object would now appear. As the process continues through more iterations, the reconstructed sub-objects 308A-C more closely resemble the original ground truth sub-object 302. After 1001 iterations (FIG. 3C) best-match solution 306C (produced by choosing a combination of PSF template intensities in dictionary 206) becomes very similar to sub-image 204. Therefore, by using the PSF template positions and intensities from this best-match solution, a super-resolved best-match reconstruction 308C is produced that closely resembles the original ground truth sub-object 302.

Figure 4:
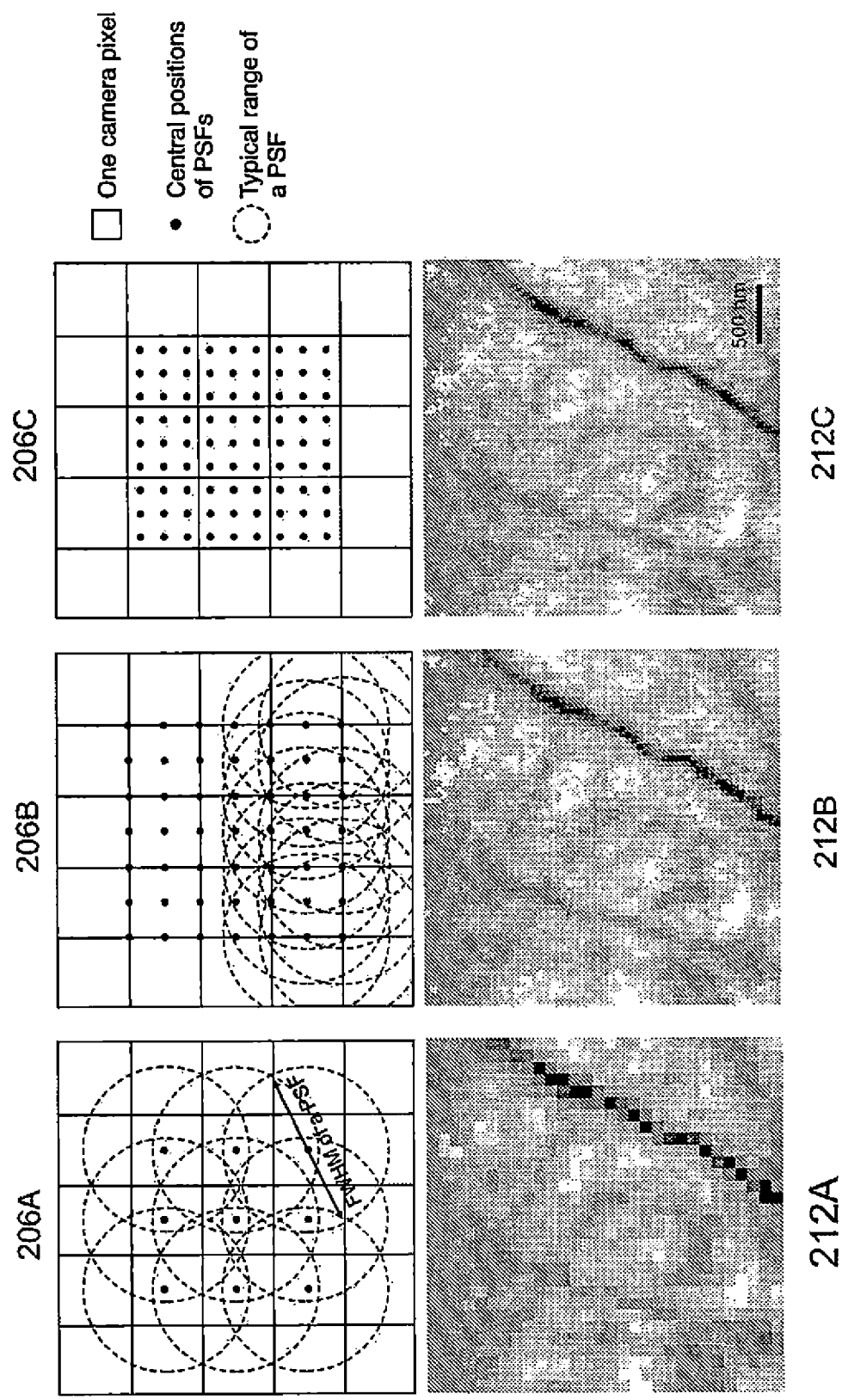
FIG. 4 illustrates three possible PSF template dictionaries where the modeled PSFs are spaced increasingly closer together and resulting reconstructed sub-objects.

FIG. 4 shows the process and results of selecting different template dictionaries 206 for the sub-image comparison and matching process. 206A is a relatively sparse PSF template dictionary, having an array of nine PSFs. 206B is a 7×7 array PSF dictionary and 206C is a 9×9 array PSF dictionary. In general, denser PSF dictionaries 206 result in more highly-resolved final images 212. Thus, image 212C is better than image 212B, which is better than image 212A. However, there are diminishing returns with denser PSF dictionaries, and processing time is increased.

Thus, it is sometimes desirable to use a sparser PSF dictionary if quick results are desired or the object is less complex. In some embodiments, a user might select a sparse PSF template dictionary for a quick initial look at the object and then use a denser PSF dictionary for higher-resolution imaging if warranted.

During the iterative process, the intensity combination of the template PSFs is varied. Preferably, the iterative process zeroes in on the best match solution efficiently.

In the present invention, details finer than the camera pixel size can be resolved by varying the design of the PSF dictionaries used as inputs to the optimization algorithm without imposing additional information (such as interpolation) to the acquired images. 206A, 206B, and 206C show examples of three possible dictionaries in which the template PSF spacing, is made successively smaller. Here each square represents one camera pixel, the dots represent the centers of the template PSFs, and the dashed circles represent the full width at half maximum (FWHM) diameters of a selected number of PSFs to show how they increase in overlap as the PSF spacing is reduced. This template spacing in each dictionary is what determines the upper bound of the resolution of the final image after processing. Images 212A, 212B, and 212C show reconstructed image results from ~900 (scanned) experimentally-acquired sub-images, of fluorescein-labeled actin filaments in a BPAE cell. The objective lens is 63×, NA 1.4. Here, 412C shows that a super-resolution of ~50 nm in XY can be achieved with the present invention as compared to the five-times worse (~250 nm) maximum (diffraction-limited) capability of the same objective when used in a standard fluorescence microscope configuration.

Figures 5A, 5B, 5C:
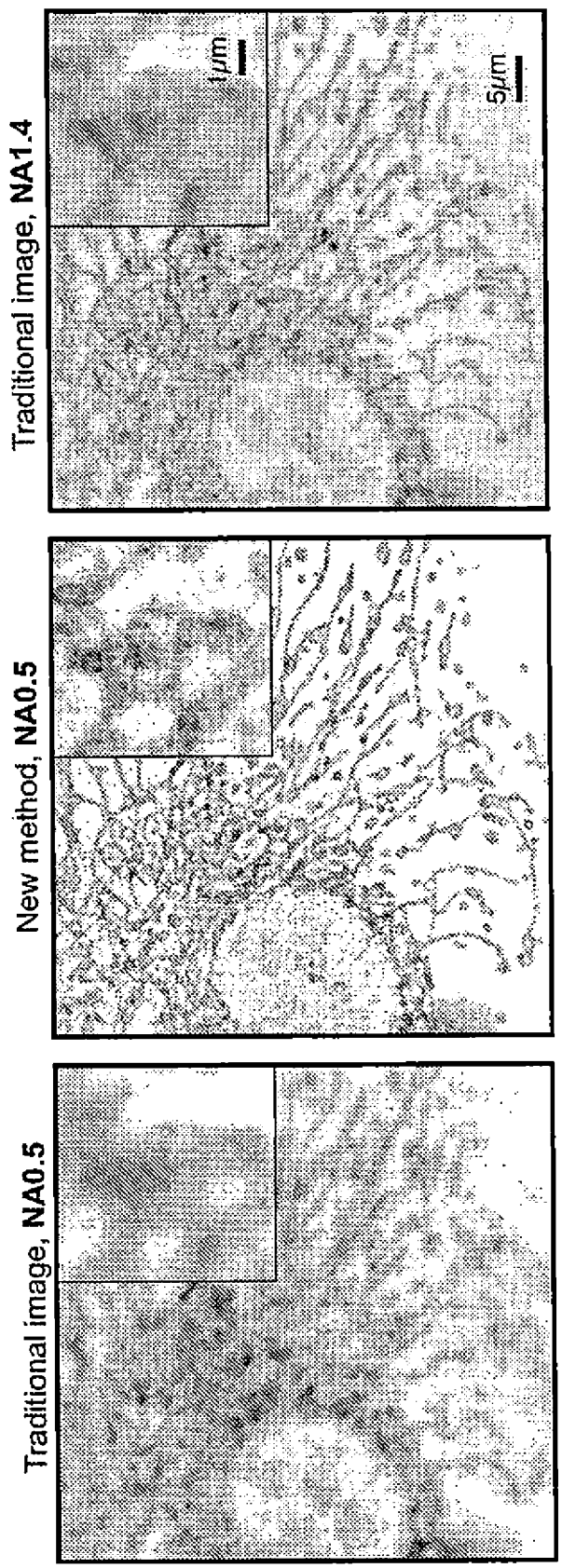
FIGS. 5A-C illustrate super-resolution imaging of a two-dimensional object compared to traditional fluorescent microscope imaging.

FIGS. 5A-C show experimental image results to confirm the super-resolution capabilities of the new invention for a two-dimensional continuous object. FIG. 5A is a traditional fluorescence microscope image and FIG. 5B is a super-resolution image generated according to the present invention. Both images are captured with a wide-field microscope with an NA 0.5 objective, but the super-resolution image (FIG. 5B) includes much more detail.

FIG. 5C shows a traditional fluorescence microscope image of the same object using a higher resolution objective lens (NA=1.4), to demonstrate that the super-resolution image FIG. 5B is accurate (rather than containing artifacts). (Note the contrast has been inverted to black on white for ease of viewing.) The object is fluorescently-labeled mitochondria in a BPAE cell. Image insets show higher magnification regions for ease of resolution comparison.

Figure 6B:
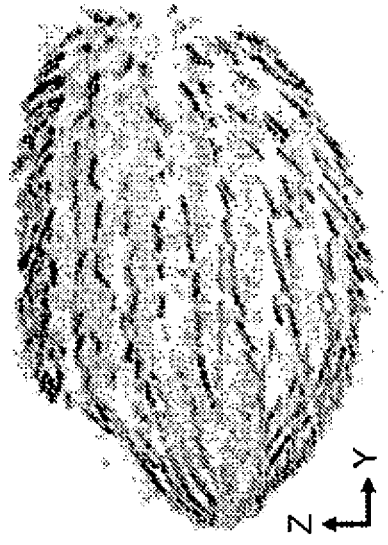
FIGS. 6A-C illustrate super-resolution imaging of a three-dimensional object compared to traditional fluorescent microscope imaging.
Figure 6C:
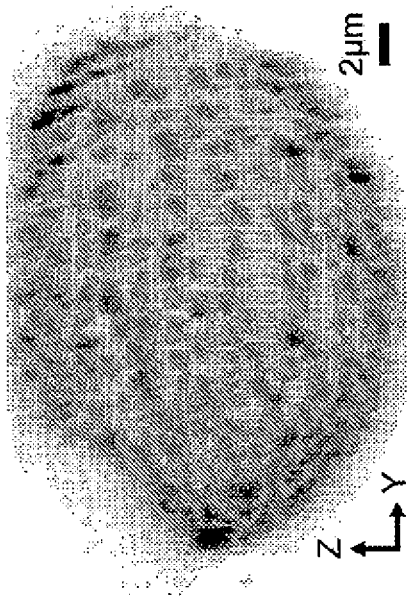
Figure 6A:
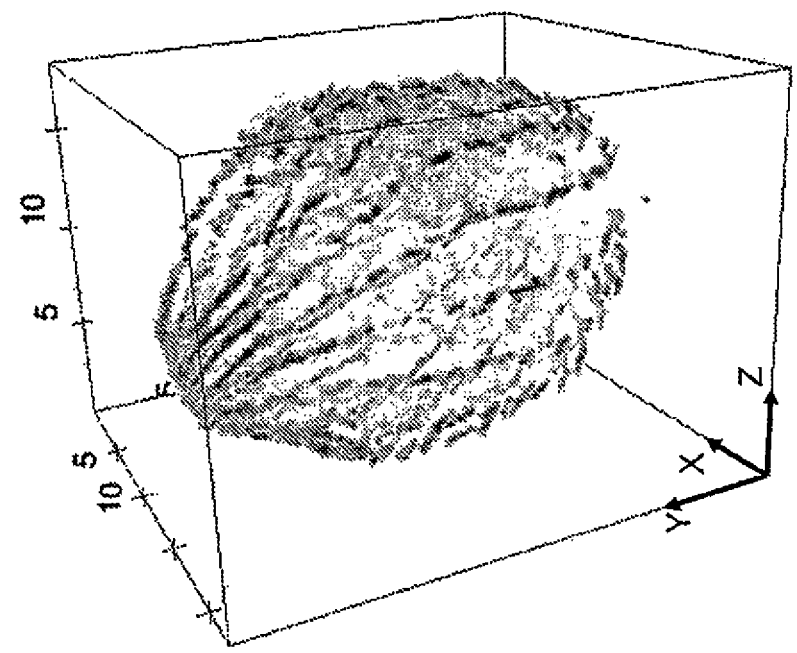

FIGS. 6A-C show super-resolution in all three dimensions is possible for continuous 3D objects using the present invention with phase plate 112 inserted in the imaging path to produce axially asymmetric ring-shaped PSFs (as described in U.S. Pat. No. 9,325,971). FIG. 6A shows a three-dimensional rendering of a super-resolved fluorescent biological object produced according to the present invention. FIG. 6B shows a side-view of the same object acquired using the new invention to illustrate its axial super-resolution capabilities as compared to a side-view image assembled from a confocal image stack (FIG. 6C). Here features along the vertical Z axis show that the super-resolution capabilities of the invention are similar to its lateral (X-Y axis) resolution capabilities (i.e. 100 nm in all three dimensions). This is unlike the confocal image 6C that shows the biological features are elongated (smeared) along the Z axis which corresponds to its much poorer axial resolution. The object is a 15 μm thick, fluorescently-labeled Tetrahymena cell. Objective is 63×, NA 1.4.

What is claimed is:

1. The method of super-resolution imaging an extended object comprising the steps of:
   (a) providing an illumination source configured to illuminate the object with an illumination spot having an illumination spot area at the object;
   (b) scanning the illumination spot across the object;
   (c) capturing a series of sub-images of the object wherein the sub-image detection region area substantially exceeds the illumination spot area;
   (d) providing a dictionary of templates comprising PSFs;
   (e) comparing each sub-image to combinations of highly-overlapping PSF templates from the dictionary, while varying intensities of individual PSF templates, to find a best-match solution for that sub-image; and
   (f) creating a best-match reconstruction of each sub-image from the best-match solution for that sub-image.

2. The method of claim 1 further comprising the step of combining best-match reconstructions from step (f) to form a super-resolution image of the object.

3. The method of claim 1 wherein step (c) captures overlapping sub-images.

4. The method of claim 1 wherein step (e) utilizes a non-negative least-squares optimization algorithm.

5. The method of claim 1 further including the step of:
   (b)(1) applying a phase adjustment to an imaging path prior to step (c); wherein the phase adjustment produces depth-encoded sub-images of the object having point spread functions (PSFs) which vary according to depth range.

6. The method of claim 5 further including the step of decoding depth range within sub-images based upon the phase adjustment.

7. The method of claim 6 further including the step of super-resolving axial information within sub-images based upon the phase adjustment.

8. The method of claim 1 wherein the object includes fluorescent photo-emitters excited by the illumination spot.

9. The method of claim 1 wherein the detection region area is approximately an order of magnitude greater than the illumination spot area.

10. Apparatus for generating a super-resolution image of an extended object comprising:
    an illumination source configured to illuminate the object with an illumination spot having an illumination spot area at the object;
    scanning apparatus configured to scan the illumination spot across the object;
    a camera configured to capture a series of sub-images of the object wherein the area of the detected region substantially exceeds the area of the illumination spot; and
    a processor configured to—
       provide a dictionary of templates comprising PSFs,
       compare each sub-image to combinations of highly-overlapping PSF templates from the dictionary to find a best-match solution for that sub-image, and
       create a best-match reconstruction of sub-image from the best-match solution.

11. The apparatus of claim 10 wherein the processor is further configured to combine best-match reconstructions and form a super-resolution image of the object.

12. The apparatus of claim 10 further comprising a phase mask disposed in an imaging path, the phase mask configured to produce depth-encoded sub-images of the object having point spread functions (PSFs) which vary according to depth-range.

13. The apparatus of claim 12 wherein the processor is further configured to decode depth-range within sub-images.

14. The apparatus of claim 12 wherein the phase mask is a circular caustic.

15. The apparatus of claim 10 wherein the illumination spot is configured to excite fluorescent particles of the object.

* * * * *

UNITED STATES PATENT AND TRADEMARK OFFICE
CERTIFICATE OF CORRECTION

PATENT NO. : 10,663,750 B2  
APPLICATION NO. : 16/085524  
DATED : May 26, 2020  
INVENTOR(S) : Jiun-Yann Yu et al.

Page 1 of 1

It is certified that error appears in the above-identified patent and that said Letters Patent is hereby corrected as shown below:

On the Title Page

Item (72) Please correct the spelling of the name of the first-named inventor, from:
Juin-Yann Yu To:
Jiun-Yann Yu Signed and Sealed this  
Seventeenth Day of November, 2020

Andrei Iancu  
*Director of the United States Patent and Trademark Office*